Feb. 14, 1939.   J. V. DUNHAM ET AL   2,146,723
DETECTING THE FLIGHT OF PROJECTILES PAST A GIVEN POINT
Filed Jan. 12, 1938
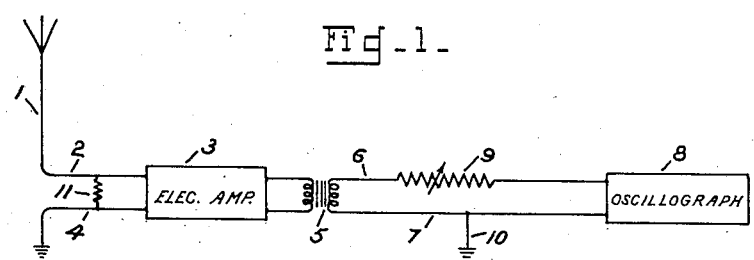
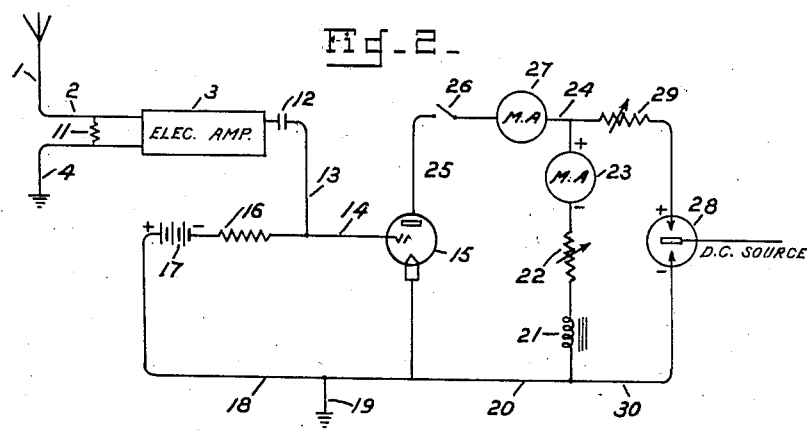
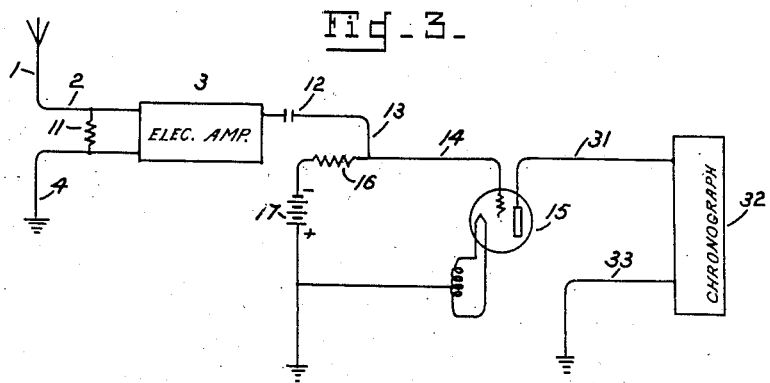
Inventors
James V. Dunham
Ernest R. Rechel
By W. N. Roach
Attorney

UNITED STATES PATENT OFFICE 2,146,723

DETECTING THE FLIGHT OF PROJECTILES PAST A GIVEN POINT

James V. Dunham, Southampton, and Ernest R. Rechel, Philadelphia, Pa.

Application January 12, 1938, Serial No. 184,637

5 Claims. (Cl. 234—1.5)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to detecting the flight of projectiles past a given point to the end that projectile velocities may be determined and ballistic apparatus may be operated.

The invention consists in mounting small antenna adjacent to the trajectory of a projectile so that charges of electricity may be induced therein by the static charge residing on the projectile.

Four general methods have been used for detecting the passage of a projectile which may be classified as the mechanical, acoustical, optical and solenoidal methods.

The mechanical method requires the projectile to sever a wire or pierce a metal foil or other metallic screen in order to record its passage through opening or closing an electrical circuit which includes the wire to be severed or the screen to be pierced. In such systems, it is essential that the projectile make contact with a stationary body, which may either retard its flight or deflect it from its normal trajectory, or both.

The acoustical method makes use of the sound wave generated at the nose of the projectile. The wave is received on a diaphragm which forms part of an electrical circuit. While there is no interference with the flight of the projectile in the system, it is not applicable to projectiles with velocities less than the velocity of sound.

In the optical method a beam of light is interrupted by the passage of the projectile, the beam recording directly on a photographic film or falling on a photoelectric cell which will show changes in conductivity when the beam is interrupted. With small projectiles, the beam must be concentrated to a diameter not much greater than the diameter of the projectile itself, thus making it difficult to squarely cut the beam and causing many failures.

The solenoidal method has the disadvantage of requiring magnetization of the projectile, and consequently cannot be used when the projectiles are made of non-magnetic material.

The discovery of the fact that a charge of static electricity resides on a projectile in flight has led to the provision of a system which avoids the objectionable features in the former systems, and provides a simple and accurate method of projectile flight detection.

With the foregoing and such other objects in view as may hereinafter appear, the invention resides in the use of the static charge of electricity found to reside on a projectile in flight for detecting the passage of projectiles and producing desired indicia therefrom.

Referring to the accompanying drawing which illustrates, schematically, devices for utilizing the static charge found to reside on projectiles in flight, Fig. 1 is a diagrammatic view of a device which uses the projectile charge for measuring velocities.

Fig. 2 is a diagrammatic view showing how the projectile charge may be used with a Le Boulengé chronograph.

Fig. 3 is a similar view showing how the projectile charge may be used with an Aberdeen chronograph.

Referring to the drawing by characters of reference:

At predetermined intervals adjacent to the intended trajectory of a projectile are placed suitable antennae 1, only one of which is shown in the drawing.

These antennae may be of any desired form and are intended to receive an induced electrical charge by reason of the passage of the statically charged projectile.

This induced charge, by reason of the lead wire 2 connecting the antenna 1 to the input of an electronic amplifier 3 and the lead wire 4, connecting the said input to ground, causes a change in the electrical potential of the control grid of the input tube of the amplifier 3, the amplified effect of such change being transmitted to the primary of an output transformer 5, the secondary of which is in a circuit having branches 6 and 7 connected to the terminals of an oscillograph 8. The branch 6 has included therein a variable resistance 9 for the purpose of maintaining the current within the limits of the oscillograph, while the branch 7 has connected thereto a lead 10 connected to ground.

A resistance 11 is connected across the lead wire 2 and 4.

The oscillographs operate in the usual way, the recording charts or strips being marked by a timing device of known frequency. In measuring projectile velocities, the antennae are set up a desired distance apart, and as the projectile passes each antenna, a record of its passage is made on the recording strip or chart, so that, knowing the distance between antennae and the frequency of the timing device, the velocity of the projectile is readily determined. This same system may be utilized to determine the deviation of a projectile from its theoretical trajectory, since the farther from the antenna the projectile is when passing, the less intense will be its effect on the oscillograph with consequent diminution of the amplitude of oscillation as recorded on the strip.

When utilizing the static electrical charge found to reside on a projectile in flight for operating the Le Boulengé chronograph, as described in "Elements of Gunnery" by T. J. Hayes, 1939, John Wiley and Sons, New York, or the standard works or ordinance and gunnery by McFarland 1929, Tschappat, 1917, or Lissak, 1915, all by the same publisher, illustrated in Fig. 2, the antenna 1, lead lines 2 and 4, electronic amplifier 3, resistance 11, are the same as heretofore described. In this instance, the output coupling condenser 12 is connected by lead 13 to a grid lead 14 connected to the grid of a gaseous triode 15. The lead 14 is part of a circuit containing a resistance 16 of from .50 to 10 megohms, a grid biasing battery 17, a lead wire 18 from the positive terminal of the battery to the cathode of the gaseous triode 15, with a grounded wire 19 connected to such lead 18 between the battery and cathode. From the cathode a lead wire 20 extends to the lower terminal of the Le Boulengé electromagnet 21, the upper terminal of such electromagnet being connected to variable resistance 22 sufficient to limit the current in the electromagnet to approximately 140 milliamperes, the other terminal of such resistance being connected to the negative terminal of a milliameter 23, the positive terminal of such milliameter being connected to lead 24. The plate of the triode 15 is connected through a lead 25, in which may be interposed a switch 26 and a milliameter 27, to lead 24 which is connected through variable resistance 29, to the positive terminal of a full wave rectifier 28. Resistance 29 is sufficient to limit the current from the rectifier to the desired value. The negative terminal of the rectifier is connected through lead 30 to the lower end of the Le Boulengé electromagnet 21.

When a projectile passes the antenna 1, an electrical charge is induced therein, causing a change in the electrical potential of the grid of the input tube of the amplifier 3, the amplified effect of such change causing a change in the grid potential of triode 15 resulting in its ionization. Previous to the ionization of the triode, the current in electromagnet 21 from rectifier 28 is so regulated by resistance 22 and 29 as to suspend correctly the Le Boulengé rod. The low resistance of the triode, due to its ionization, causes a drop of potential across the electromagnet such that the current in the electromagnet is reduced to a value which allows the suspended rod to fall in the usual and well known manner.

The gaseous triode is deionized by opening switch 26. Two of the described devices are necessary for operating the Le Boulengé chronograph, one being connected to each of the chronograph electromagnets.

When using the projectile charge for operating an Aberdeen chronograph, also described in the previously mentioned publication, the antenna 1, lead 2, amplifier 3, lead 4, resistance 11, condenser 12, leads 13 and 14, gaseous triode 15, resistance 16 and battery 17, are the same as heretofore described and arranged. In this instance, a plate connection 31 leads directly to one terminal of an Aberdeen chronograph 32, the other terminal of which is connected by lead wire 33 to ground.

When a projectile passes the antenna in this instance, the ionization of the gaseous triode causes a discharge of the condensers in the chronograph, thereby generating a high tension current, which passes across a spark gap and punctures a recording strip in the usual and well-known manner. It is also possible to utilize such high tension discharge to operate a spark camera for photographing projectiles in flight.

Having described our invention and certain methods of operating the same, we claim:

1. The method of detecting the passage of a projectile past a given point, which consists in collecting at said point an induced static charge from the static charge residing on a projectile in flight, then utilizing the effect of the same to produce desired indicia.

2. The method of securing data concerning a projectile in flight, which consists in collecting from the static charge residing on a projectile in flight an induced static charge, then utilizing the effect of the same to produce desired indicia.

3. The method of securing data concerning a projectile in flight, which consists in collecting from the static charge residing on a projectile in flight induced static charges at predetermined locations, and then utilizing the effect of the same to produce desired indicia.

4. The method of securing data concerning a projectile in flight, consisting in collecting from the static electrical charge residing on a projectile in flight an induced static charge, and then utilizing the effect of the same to release bound electrical charges, and producing a spark through means of the high voltage current resulting from the release of such bound charges.

5. The method of detecting the passage of a projectile past a given point which consists in collecting at said point an induced static charge from the static charge residing on a projectile in flight and utilizing the collected charge to change the electric potential of associated mechanism.

JAMES V. DUNHAM.
ERNEST R. RECHEL.